United States Patent Office 3,637,855
Patented Jan. 25, 1972

3,637,855
PREPARATION OF AMINES FROM N-SUBSTITUTED AMIDES
Harlan E. Tiefenthal, Western Springs, and Eugene J. Miller, Wheaton, Ill., assignors to Armour Industrial Chemical Company, Chicago, Ill.
No Drawing. Filed July 1, 1968, Ser. No. 741,291
Int. Cl. C07c 85/12
U.S. Cl. 260—583                                    12 Claims

ABSTRACT OF THE DISCLOSURE

A process for preparation of primary and secondary amines comprising reacting an N-substituted amide with alkyl amines at an elevated temperature. The reaction may be carried out in the vapor phase with the lower alkyl amines. The amines formed by this reaction are useful as mineral flotation agents, biocides, and as intermediates to form surface active chemicals such as diamines, quaternary ammonium compounds and the like.

BACKGROUND OF THE INVENTION

The prior art methods for converting N-substituted amides to amines have been hydrolysis of the amide in suitable acid or base aqueous or alcoholic solutions. Hydrolysis agents which have been used previously include aqueous sulfuric acid, aqueous sodium hydroxide, sodium hydroxide in alcohol and aqueous alcohol, aqueous potassium hydroxide, potassium hydroxide in alcohol and aqueous alcohol, and sodium methoxide in alcohol, at about 50% concentration. U.S. Pat. 3,338,967 illustrates the hydrolysis of N-substituted amides to amines using prior art methods. Previously used hydrolysis techniques for conversion of N-substituted amides to amines have severe disadvantages in that the systems are extremely corrosive to the containment vessels at the high temperatures which must be employed to obtain satisfactory conversion to the amine. The products obtained from N-substituted amides by conventional hydrolysis techniques are contaminated with salts of the hydrolysis agents and extensive purification and distillation techniques must be employed to obtain commercially acceptable amines.

SUMMARY OF THE INVENTION

We have discovered that many disadvantages inherent in production of amines by hydrolysis of N-substituted amides are avoided by reacting an N-substituted amide with an alkyl amine at an elevated temperature.

We have found that by reacting an N-substituted amide with an alkyl amine at elevated temperatures we can obtain good yields of primary and secondary amines. The reaction may be conducted in the vapor phase when using lower alkyl amine reactants having boiling points below 300° C. at atmospheric pressure, above which decomposition of the amines becomes significant. The higher alkyl amines may be reacted in the liquid phase. Amines produced in vapor phase may be readily recovered in a form which is suitable for many applications without further purification. Further, our reaction may be carried out in ordinary chemical process equipment, such as constructed from mild steel, without presenting corrosion problems. Our process is especially well suited for continuous flow liquid or vapor phase systems in which conversion to the amine requires short residence times.

Accordingly, it is an object of our invention to provide an efficient process for the conversion of N-substituted amides to amines in a relatively non-corrosive medium.

It is a further object to provide a process for conversion of N-substituted amides to amines at atmospheric or slightly higher pressure, thus obviating requirements for high pressure process equipment.

It is still another object of our invention to provide a vapor phase process for conversion of N-substituted amides to commercially acceptable amines with little or no further purification and distillation.

It is an object to provide a process for production of primary and secondary amines from N-substituted amides by a continuous process.

These and other objects which will become apparent from the further description are obtained by the process of our invention.

Our process may be illustrated by the following equation:

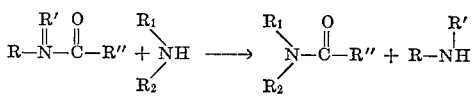

wherein R is selected from the group consisting of alkyl and alkenyl radicals having from 1 to about 22 carbon atoms, alicyclic radicals having from 4 to 12 carbon atoms, and mono- and bicyclic aryl radicals having from 6 to 16 carbon atoms and their lower alkyl, amino ($-NH_2$) and cyano substituted derivatives; R' is selected from H and the same radicals as R, provided that the total number of carbon atoms in R and R' combined is less than about 30; R" is selected from H and the same radicals as R, provided that the total molecule contains less than 31 carbon atoms; $R_1$ is selected from the group consisting of alkyl and alkenyl radicals having from 1 to about 22 carbon atoms, and $R_2$ is selected from the group consisting of alkyl and alkenyl radicals having 1 to about 22 carbon atoms and hydrogen. The alkyl and alkenyl radicals may be straight chain or branched chain wherein the branch may be symmetrical or unsymmetrical, and they may be substituted with non-interferring groups. Particularly suitable substitutions include amino and cyano derivatives. Mixtures of mono-substituted amides having different groups may be used as well as mixtures of mono- and di-substituted amides. The di-substituted amides may be symmetrical or unsymmetrical with respect to the substitution on the nitrogen atom. Normal and secondary-alkyl groups are preferred.

The process of our invention for preparing primary and secondary amines may be conducted in the vapor phase when using lower amine reactants having a boiling point below about 300° C. The vapor phase process can be carried out using any suitable method of vaporizing an N-substituted amide into a vapor stream of the amine, reacting the N-substituted amide with the lower alkyl amine to form the desired amine from the amide by transacylation. The desired amine product may be obtained from the mixed amide-amine vapor phase by simple distillation which normally results in an amine product of sufficient purity for most uses. The reaction takes place very quickly in the vapor phase, contact times of as little as one second producing high yields of product.

We prefer to introduce the amide into a vaporizing chamber which is maintained at a temperature of from about 200 to 350° C. A preferred temperature for most amides is from about 220 to 300° C.

The stoichiometry of the reaction requires one mole of amine per mole of amide. When the amide reactant has a low boiling point, and is thus readily vaporized, amounts of amine close to the stoichiometric requirement may be used. It is preferred to introduce the amine in a molar excess, based upon the amide reactant. When higher boiling point amides are used, it is desirable to use an excess of amine to serve as a carrier, and it is suitable to use a molar ratio of amine to amide of from about 2:1 to 70:1. Ratios of amine to amide higher than 70:1 may be used, but do not appear to offer any advantages. Ratios in the range of 4:1 to 12:1 are preferred.

The mixed vapor stream of amide and amine is carried from the vaporizing chamber preferably through a chamber providing large surface areas to promote the rate of reaction of the vapor reactants. Such a packed chamber is preferably maintained at a sufficiently high temperature to maintain the reactant amine and amide in the vapor phase. Suitable temperatures range from about 200 to 350° C., from about 250 to 320° C. being preferred. It is known that amines deaminate with heat, and it is surprising that deamination does not present a great problem in our process. However, for this reason temperatures greatly in excess of those necessary to maintain the vapor phase are not desired.

The reaction chamber may be packed with any material which serves to increase surface contact. Such materials are well known in the art, such as bauxite, purified aluminum oxide, magnesium oxide, alumina silicate, metal and ceramic meshes, glass beads, and any of the materials commonly used in packing distillation columns. We have found bauxite to be especially suitable.

Our vapor phase process may be carried out at about atmospheric pressure. However, slight positive pressure can be used for the more volatile amide and/or amine reactants in order to obtain the preferred reaction temperature, while sub-atmospheric pressure can be used for amides and/or amines of low volatility in order to bring the reactants into the reaction zone at a suitable temperature. Pressures from about 50 mm. to 3 atmospheres are suitable.

While it is usually desirable to use an excess of amine reactant, which may be readily recovered from the product stream and returned to the vaporizing chamber, it is readily seen that the vapor phase process is suitable for a continuous process for the manufacture of amines from N-substituted amides, producing amines of high purity.

The higher alkyl amine reactants having boiling points above about 300° C. at atmospheric pressure may be reacted in the liquid phase. The amide and amine reactants may be introduced into a reaction vessel in any order. The mixture is then heated with mixing to from about 200 to 350° C., from about 250 to 320° C. being preferred. The mixture is maintained at that temperature with stirring for about 4 to 20 hours. The desired amine product may be recovered from the mixture by fractional distillation.

It is preferred to utilize a molar excess of reactant amine, based upon the stoichiometry of the reaction. It is suitable to use a molar ratio of reactant amine to amide of from about 2:1 to 20:1. Ratios of amine to amide higher than this may be used, but do not appear to offer any particular advantages. Ratios of from about 2:1 to 10:1 are preferred.

Our liquid phase process may be initiated at about atmospheric pressure, and continued at the autogenous pressure which is obtained by the heating of the reactants. However, suitable pressures can be utilized to advantage to remove one of the products by distillation.

It is observed from the above reaction conditions that a wide variety of equipment may be suitably used. We have found that corrosion is not a problem in our process and that mild steel process equipment is suitable for either the liquid or vapor phase reactions.

The following examples are presented to illustrate the present invention.

Example I 149.4 grams of N-($C_{11-14}$ sec-alkyl)acetamide (82.6% amide, 6.1% amine, 3.7% water; I.V. 15.9) were added to a heated flask having an exit passing into a vapor phase reaction chamber packed with bauxite. The exit of the reaction chamber passed through a second flask and water cooled reflux condenser into a third flask, which was vented to the atmosphere through a cooled reflux condenser. The temperature of the acetamide in the first flask was raised to and maintained at about 270 to 280° C. and methylamine was bubbled through the acetamide at the rate of 1.0 to 2.0 liters per minute over a 4½ hour period. The catalyst temperature was from 275 to 280° C. At the end of the 4½ hour period, the first flask contained 5.0 grams of residue, and the second flask contained a crude yield of 158.3 grams of material having the following analysis:

| Amine: | Percent |
|---|---|
| Primary | 69.5 |
| Secondary | 1.5 |
| Amide | 17.7 |

The overall amine yield of N-($C_{11-14}$ sec-alkyl)amine was 99.5% of the theoretical yield, and the amide yield was 72.7% of the theoretical yield of N-methylacetamide.

Example II

Using the same apparatus and N-($C_{11-14}$ sec-alkyl) acetamide as in Example I, the vapor phase reaction was carried out using dimethylamine at a rate of 0.75 to 1.0 liters per minute over a 6 hour period. A pot temperature of 245 to 300° C. and a bauxite temperature of 260 to 290° C. were maintained. 47.7 grams of residue remained in the first flask and had the following analysis:

| | Percent |
|---|---|
| Amide | 90 |
| Amine | 0.6 |

A crude yield of 90 grams of product in the second flask had the following analysis:

| | Percent |
|---|---|
| Amide | 28 |
| Amine | 57 |

The overall amine yield of N-($C_{11-14}$ sec-alkyl)amine was 67% of the theoretical and the amide yield was 83.5% of the theoretical yield based upon N,N-dimethylacetamide.

Example III

A 300 ml. autoclave was charged with 22.6 grams (0.0995 mole) of N-(sec-dodecyl)acetamide and 51.3 grams (0.398 mole) of octylamine. The mixture was heated to and maintained at about 250° C. for 11 hours. Then the product had the following composition compared to the initial composition of the mixture (as determined by gas chromatography).

| Component | Percent by weight | |
|---|---|---|
| | Initial | Final |
| N-(sec-dodecyl)acetamide | 30.6 | 7.2 |
| Octylamine | 69.4 | 57.8 |
| Sec-dodecylamine | | 15.4 |
| N-octylacetamide | | 19.7 |

Based on the final composition, the conversion of N-(sec-dodecyl)acetamide to sec-dodecylamine was 62 percent of theoretical.

Example IV

A 300 ml. autoclave was charged with 11.3 grams (0.05 mole) of N-(sec-dodecyl)acetamide and 53.8 grams (0.2 mole) of octadecylamine. The mixture was heated to and maintained at about 250° C. for 12 hours. Then the product had the following composition compared to the initial composition of the mixture (as determined by gas chromatography).

| Component | Percent by weight | |
|---|---|---|
| | Initial | Final |
| N-(sec-dodecyl)acetamide | 17.3 | 4.0 |
| Octadecylamine | 82.7 | 69.2 |
| Sec-dodecylamine | | 9.4 |
| N-octadecylacetamide | | 16.7 |

Based on the final composition, conversion of N-(sec-dodecyl)acetamide to sec-dodecylamine was 66 percent of theoretical.

Example V

A 300 ml. autoclave was charged with 17.1 grams (0.1 mole) of N-(n-octyl)acetamide and 96.4 grams (0.4 mole) of di-n-octylamine. The mixture was heated to and maintained at about 250° C. for 11.5 hours. Then the product had the following composition compared to the initial composition of the mixture (as determined by gas chromatography).

| Component | Percent by weight | |
|---|---|---|
| | Initial | Final |
| N-(n-octyl)acetamide | 15 | |
| n-octylamine | | 5.55 |
| di-n-octylamine | 85 | |
| N,N-di-(n-octyl)acetamide | | 70.2 |

Based on final composition, the conversion of N-(n-octyl) acetamide to n-octylamine was 48.8% of theoretical.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for preparing an amine having the formula

wherein R and R' are as defined below comprising reacting an amine having the formula

wherein R₁ is selected from the group consisting of alkyl and alkenyl radicals having from 1 to about 22 carbon atoms, and R₂ is selected from the group consisting of alkyl and alkenyl radicals having from 1 to about 22 carbon atoms and hydrogen with an amide having the formula

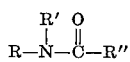

wherein R is selected from the group consisting of alkyl and alkenyl radicals having 1 to about 22 carbon atoms and their —NH₂ substituted derivatives, cycloalkyl radicals having 4 to 12 carbon atoms, and phenyl and its lower alkyl and —NH₂ substituted derivatives; R' is selected from H and the same radicals as R, provided that the total number of carbon atoms in R and R' combined is less than about 30; and R'' is selected from H and the same radicals as R, provided that the total molecule contains less than 31 carbon atoms; said amine and amide being present in a mole ratio of from about 1:1 to 70:1, at a temperature from about 200 to 350° C. to form said amine.

2. The process of claim 1 wherein said process is conducted in the vapor phase.

3. The process of claim 1 wherein said temperature is from about 220° to 300° C.

4. The process of claim 2 wherein said amine and said N-substituted amide are present in a mole ratio of from about 2:1 to 70:1.

5. The process of claim 1 wherein said mole ratio is from about 4:1 to 12:1.

6. The process of claim 1 wherein said reaction is carried out in a packed chamber to increase surface contact.

7. The process of claim 6 wherein said chamber is packed with bauxite.

8. The process of claim 1 wherein said process is conducted in the liquid phase.

9. The process of claim 8 wherein said amine and said N-substituted amide is present in a mole ratio of from about 2:1 to 20:1.

10. The process of claim 1 wherein R is an alkyl radical having 1 to about 22 carbon atoms.

11. The process of claim 10 wherein R₁ is an alkyl radical having 1 to about 22 carbon atoms and R₂ is selected from the group consisting of alkyl radicals having 1 to about 22 carbon atoms and hydrogen.

12. The process of claim 1 wherein the N-substituted amide is N-(sec-alkyl)acetamide.

References Cited
UNITED STATES PATENTS

| 2,166,971 | 7/1939 | Schmidt et al. | 260—583 L |
| 3,190,922 | 6/1965 | Le Bard et al. | 260—583 L |
| 3,457,311 | 7/1969 | Tiefenthal et al. | 260—583 L |

CHARLES B. PARKER, Primary Examiner

R. L. RAYMOND, Assistant Examiner

U.S. Cl. X.R.

260—465, 465.2, 563, 576, 577, 578